Patented May 9, 1933

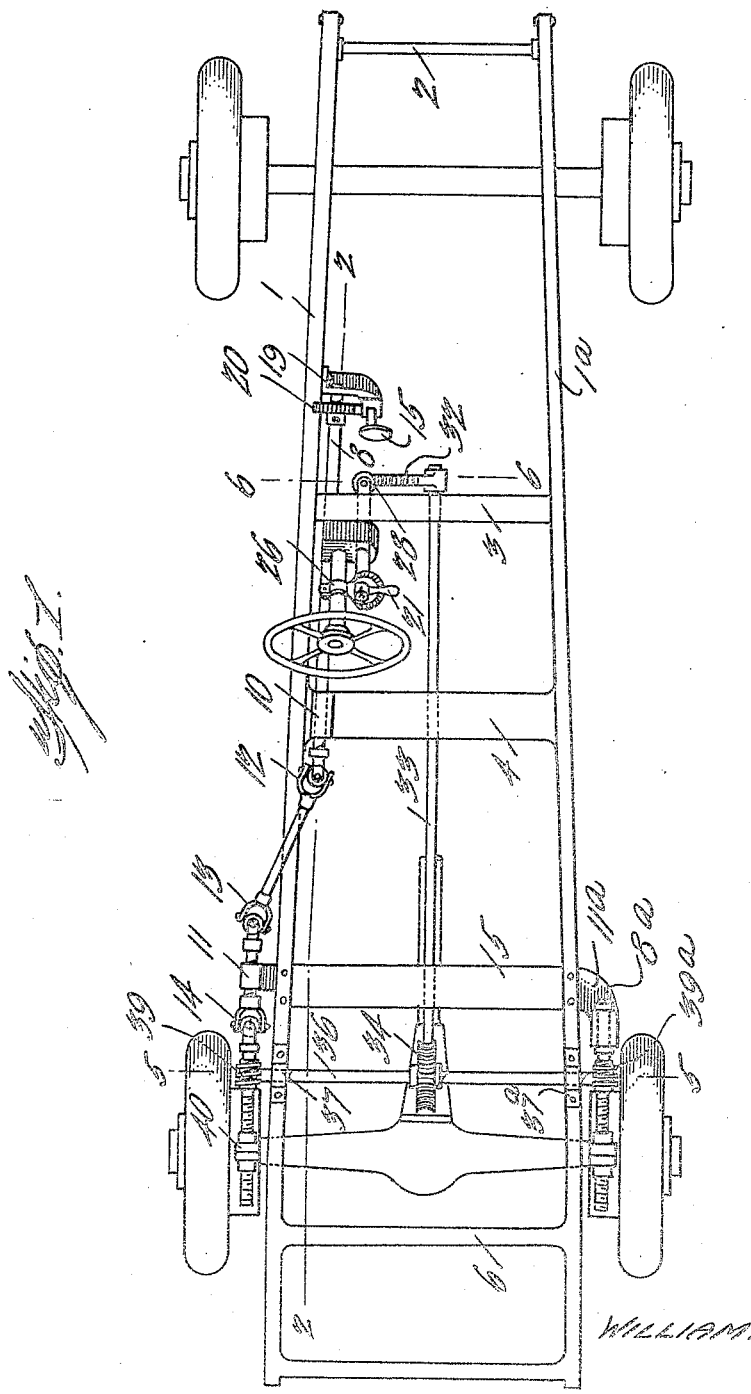

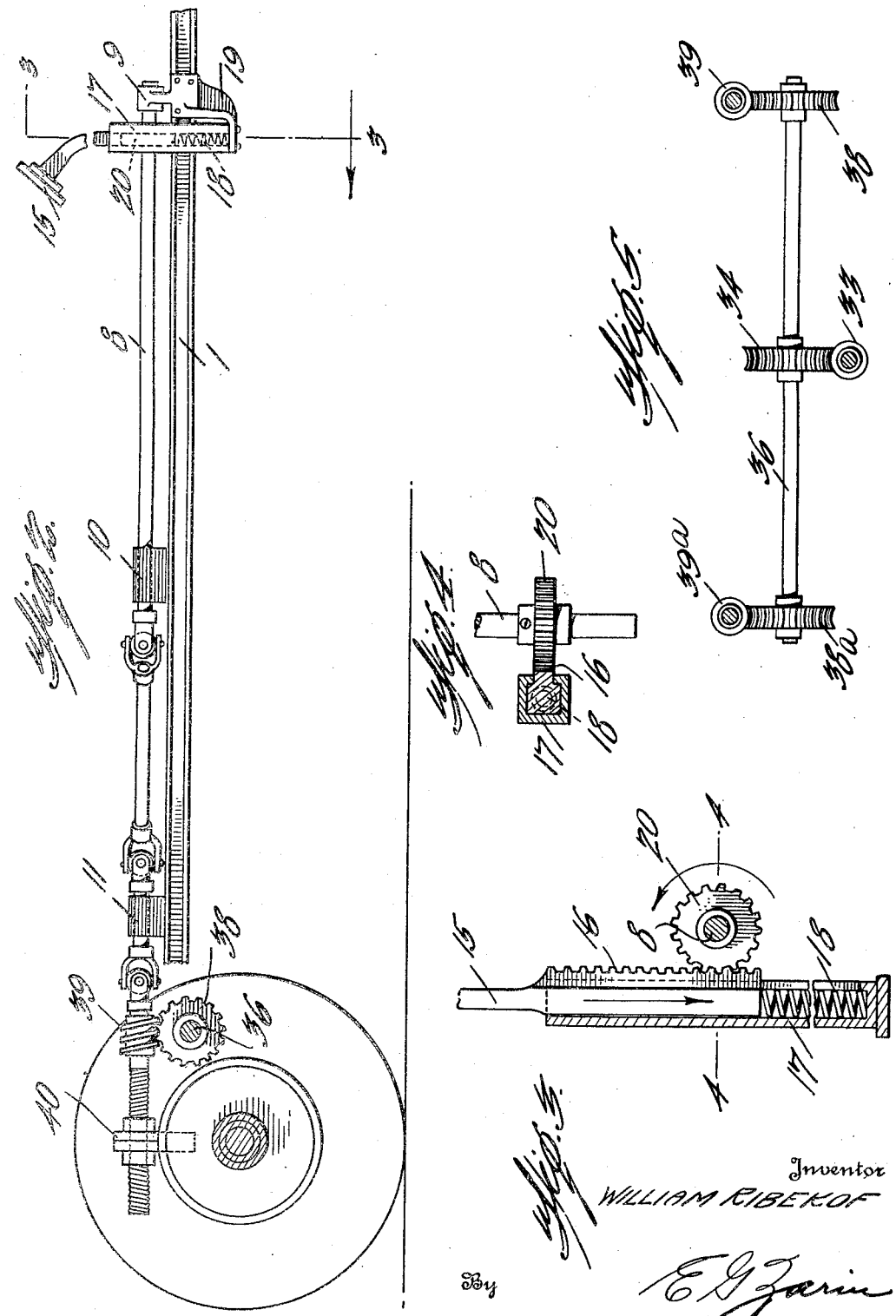

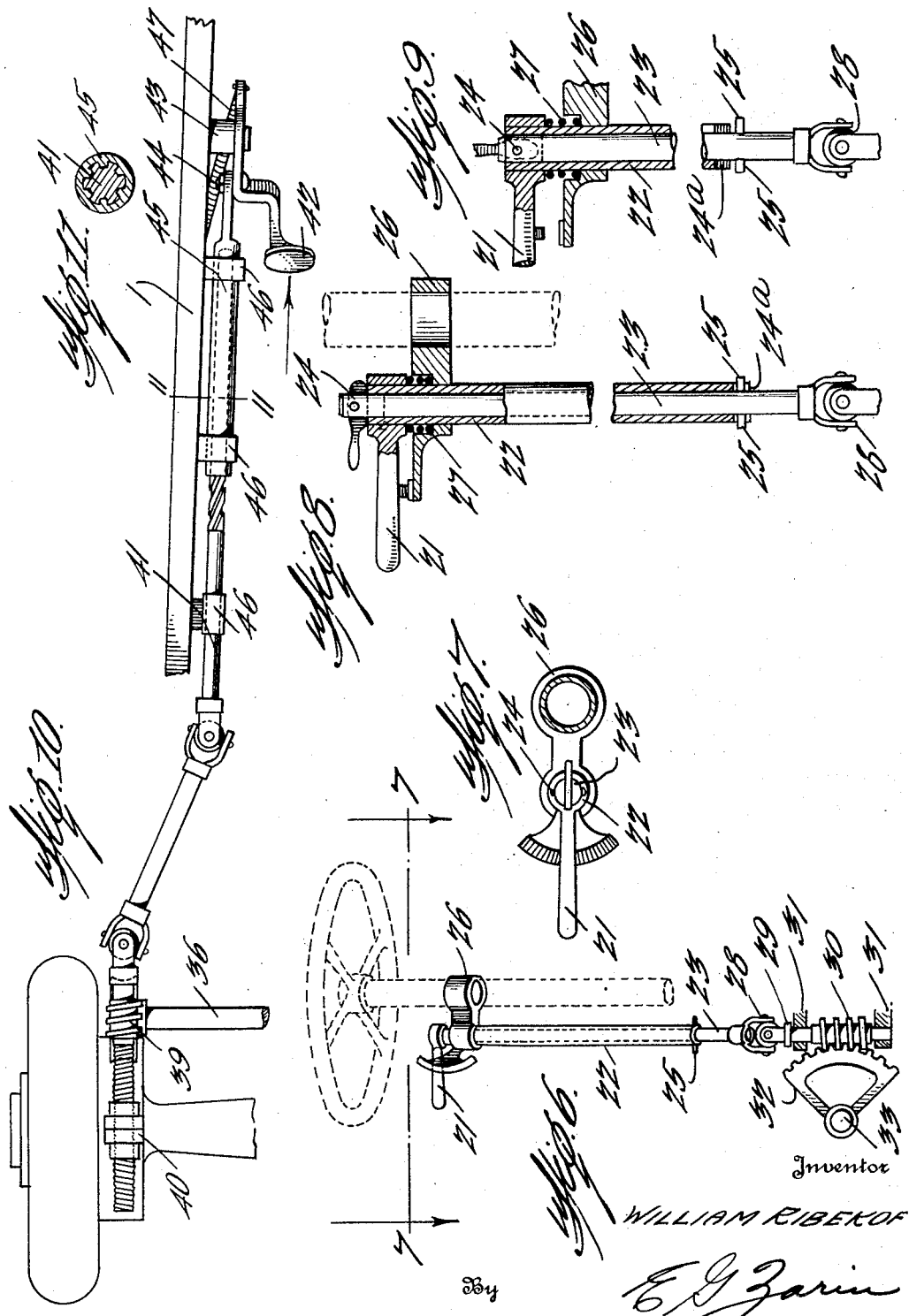

1,908,183

UNITED STATES PATENT OFFICE

WILLIAM RIBEKOF, OF BALTIMORE, MARYLAND

BRAKING SYSTEM FOR AUTOMOTIVE VEHICLES

Application filed March 25, 1931. Serial No. 525,231.

The present invention relates to improvements in braking systems for automotive vehicles and has for its object a simplified braking mechanism which is immediately responsive to a braking application whether it be from the foot pedal which is the actuator for the "service brake system" or from the manually controlled handle which is the actuator for the "emergency brake system".

Each of these systems include the above mentioned actuating means together with a system of gearing and rod which allow the application of the same brake by both of the systems.

As will be seen from the drawings forming part of this invention, taken together with the specification, that the invention contemplates an arrangement of worm gears and rods with means for controlling the position of the rods and necessarily the brakes of the automobile controlled thereby, which are much simpler, safer and much more efficient than the ordinary type of rods and cables with their actuating means now used on automobiles.

This invention further contemplates an emergency brake which is controlled by a handle adjacent to the steering wheel in easy reach of the operator of the automobile. The emergency brake system is such that the internal resistance of the gearing of the system causes the brakes to remain in the position in which they are thrown by the system and this is because the system includes gears and worms. While the braking system, as stated before, both the service and emergency brake systems, actuate the same brakes, this can be readily changed so that the service system actuates an external brake while the emergency system operates on an internal brake, both within the same wheel.

In the drawings:

Figure 1 is a plan view of an automobile construction with the body removed to disclose more clearly the braking systems utilized.

Figure 2 is a vertical section taken on a line 2—2 of Figure 1.

Figure 3 is an enlarged showing of the brake pedal or service brake actuator, and associated gearing on line 3—3 of Figure 2.

Figure 4 is a horizontal section on line 4—4 of Figure 3.

Figure 5 is a vertical section on line 5—5 of Figure 1 showing in detail the connection between the service system and the emergency system.

Figure 6 is an enlarged vertical section taken on the line 6—6 of Figure 1, showing the means for applying the emergency system.

Figure 7 is taken on the line 7—7 of Figure 6 and is an enlarged showing of the handle for controlling the brakes, through the emergency system.

Figure 8 is a vertical section of the emergency system applying mechanism shown in Figure 6.

Figure 9 is a similar view to Figure 8, but shows the emergency system actuating lever unlocked.

Figure 10 shows a modification of the means for applying the service brake system.

Figure 11 is a vertical section on line 11—11 of Figure 10.

Like reference numerals designate corresponding parts throughout the several figures of the drawings.

In the drawings 1 and 1ª are side members of the automobile frame. The reference numerals 2, 3, 4, 5 and 6 designate cross members connecting and holding the side members of the automobile frame. The service brake rod 8 which is adjacent to the side member 1 of the automobile frame is supported so as to turn in the brackets 9, 10 and 11. Throughout the length of the service brake rod are the universal joints 12, 13 and 14, placed therein so that the rod can terminate on the outside of the frame adjacent the rear wheel of the automobile where it is attached to the actuator for the brake shoe within the drum of that wheel of the car. The actuator for the service brake system is the foot pedal 15 which has attached thereto on one side the rack 16. The foot pedal and rack are enclosed in a metal case 17, which has one side open through which projects the rack 16. In the bottom of the case 17 below the foot pedal and the rack carried thereby is a coil spring 18 which tends to hold the pedal and rack up from the bottom of the case 16, except when the effect of the spring is overcome by the effort exerted on the foot pedal by the operator of the automobile. The case for the pedal is supported from the frame 1 by the bracket 19. Engaging with the teeth of the rack 16 is a gear 20 that is secured to the foot service brake rod 8 so that pressure exerted on the foot pedal 15 will cause the associated mechanism to turn the foot pedal rod 8 and apply a braking application to the wheels of the automobile.

I will next describe the means and system for applying the emergency braking system. Below an adjacent steering mechanism (see Figure 6) there is within easy reach of the operator a handle or lever 21 for controlling the emergency braking system. This handle 21 surrounds and is firmly attached at one end of the tubular member 22. The tubular member 22 is slideably mounted on the round rod 23, which has in one end thereof, mounted for pivotal movement, a latch 24 whose function will be described shortly. At the lower end of the tubular member 22, diametrically disposed to each other, are cut two rounded notches 24ª of such shape as to receive the round pin 25 which penetrates through the rod 23. The upper end of the assembly just described is carried from the bracket 26 which encircles the steering post carrying the steering wheel of the automobile. Inserted between bracket 26 and the shoulder formed where the emergency operating handle is connected to the tubular member 22 is inserted a coil spring which tends to hold the emergency actuating handle, tubular member 22 and the notches on the lower end thereof out of contact with the pin 25, as shown in Figure 9. The efforts of the spring 27 to hold the mechanism just described out of engagement, can be overcome by pushing down on the lever or handle 21 and turning the latch so that the upper end of the tubular member 22 cannot raise. The assembled mechanism is then locked by the latch 24 so that the pin 25 is in engagement with the notches 24ª on the lower end of the tubular member 22 (see Figure 8). On bracket 26 is the guide or support on which the "emergency brake system" is supported or carried from the steering post (see Fig. 6). The handle 21, through which energy is applied to the emergency brake is firmly attached to one end of the tubular member 22. Within the member 22 is the rod 23 which is directly connected to the brakes. When the member 22 is held down (see Fig. 8) against the action of the spring 27 by the latch 24, so that the notches 24ª are engaged by the pin 25 on the rod 23, effort applied to the handle 21 will be transmitted to the brakes. Attached to the lower end of the rod 23 is the universal joint 28 so as to change the angle but still make responsive to the position of the rod 23 the rod 29 to which is secured the worm 30. The rod 29 penetrates and is supported by the bracket 31. The quadrant 32 which is securely affixed to the end of the emergency brake rod 33 engages the worm 30. The emergency brake rod 33 which terminates at its forward end with the segment 32 and on its rear end with the worm 33, is supported in the automobile chassis by brackets which extend down from the frame cross members 3, 4 and 5. While in the drawings this emergency brake rod 33 is shown as one piece as it runs in a straight line, it can be made of sections which are connected by universal joints if the rod is to change its angle like that shown for the service brake. The worm 33 engages the gear 34 which is securely attached to the rod 36 which is supported at each end by brackets 37 and 37ª on top of the automobile side frames 1 and 1ª. Affixed to the cross rod 36 of the emergency brake system are the gears 38 and 38ª which engage the worms 39 and 39ª, the first of which is carried by the last section of the service brake rod 8. The rear end of the brake rod 8 has a portion with right and left hand threads which threads engage the ends of the brake shoe 40, so that by turning the rod 8 in a counter clockwise manner the brake shoes of the car are contracted over the brake drums. The brake rod 8 has no longitudinal movement but can rotate. It must be remembered that the rod 8 forms part of both the "emergency and service brake systems". The brake mechanism for the wheel on the side opposite from that occupied by the driver is identical with that on the other side when taken on the line 5—5 of Figure 1, the only difference in the sides being that the front end of the brake rod 8ª terminates opposite the front of that rear wheel and is supported in the bracket 11ª which extends from the side 1ª of the car.

In Figures 10 and 11, I show a modified structure for the service brake system. In these figures the service brake system rod 41 is turned not by the ratchet 16 attached to the pedal 15 when the same is depressed as shown in the other figures of the drawings, but by pushing the pedal 42 forward. The pedal 42 is pivotally mounted on a projection 43 attached to the side frame 1 of the car. Between the pivotal mount of the pedal and the enlarged head on which the operator places his or her foot to apply the brake, there is attached to the pedal by the bolt 44, a member 45. This member 45 is hollow through its greater part and is internally threaded. Corresponding companion grooves are on the brake rod 41 which penetrates the member 45. The brake rod 41 is supported by and is free to turn within the brackets 46 attached to the automobile side frame 1. In this modified form I repeat again that the turning action of the brake rod 41 is accomplished through the forward movement of the member 45 which moves forward when the brake pedal 42 moves forward through effort of the operator. Except for the above, the mechanism shown in the Figures 10 and 11 is identical with the service brake system shown in the other drawings and it is contemplated that this form of service brake can be used in connection with the emergency brake system disclosed in the other figures of the drawings. The spring 47, one end of which is attached to the car frame tends to hold the foot pedal 42 in an upright position as shown in Figure 10, but the effort of this spring is overcome when the operator of the automobile pushes the pedal down and forward as is done in driving the ordinary automobile.

The purpose of the spring 18 shown in Figure 3 and the spring 47 shown in Figure 10 is to release the brakes when through the service brake system the same have been applied by force exerted by the foot of the operator on the foot pedals designated as 15 and 42 in the figures just above referred to.

The application of the brakes through the service brake system does not move the handle actuator 21 for the emergency brake system because the same is disengaged from the braking system when the latch 24 is up so that the tubular member 22 and the notches 24ª carried on the lower end thereof are not engaged by the pin 25 in the rod 23 of the emergency brake system. I have shown that the service brake system does not affect the actuator for the emergency brake system and that the brakes will be released when the operator ceases to place pressure on the actuator for the service brake system. Through the handle 21 the emergency brake system is actuated and the position of the brake shoes within the drums of the automobile wheels is controlled. As stated before, the resistance of the gearing is such that the brakes are controlled by the position which the handle 21 is in.

The pitch of the threads in the worms and gears should be such that with the least movement of one the other enmeshing worm or gear moves a maximum amount.

Having thus described my invention, what I claim as new and desire to secure by Letters Patent is:

1. In a vehicle brake system, including guiding means for the vehicle, the combination of two means for manually applying the same brakes, said means comprising a handle carried from the guiding means of the vehicle and the other means comprising a foot actuated pedal with a tubular member having therein spiral threads, a rod controlling the position of the brakes, one end of which penetrates the said tubular member with grooves therein fitting into threads of the tubular member, whereby the rod is caused to turn on the forward movement of the foot pedal and the tubular member.

2. In a vehicle brake system, including guiding means for the vehicle, the combination of two manually operated means for applying the same brakes at different points with a latch at one of the points, for connecting and disconnecting the brakes from the manual operation at that point, a foot pedal having thereon a rack engaging a gear carried by a rod connected to the brakes of the vehicle whereby a downward movement of the foot pedal turns the rod and governs the position of the brakes of the vehicle, the other operating means being a handle adapted to be turned and carried by the means for guiding the vehicle and having thereon said latch for disengaging the handle so that the handle will not turn when the brakes are applied by the foot pedal.

In testimony whereof I affix my signature.

WILLIAM RIBEKOF.